(12) United States Patent
Raviola et al.

(10) Patent No.: US 9,412,080 B2
(45) Date of Patent: Aug. 9, 2016

(54) METHOD AND SYSTEM FOR HANDLING CONDITIONAL DEPENDENCIES BETWEEN ALTERNATIVE PRODUCT SEGMENTS WITHIN A MANUFACTURING EXECUTION SYSTEM ANSI/ISA/95 COMPLIANT

(71) Applicant: SIEMENS AKTIENGESELLSCHAFT, Munich (DE)

(72) Inventors: Alessandro Raviola, Genoa (IT); Elena Reggio, Genoa (IT)

(73) Assignee: Siemens Aktiengesellschaft, Munich (DE)

( * ) Notice: Subject to any disclaimer, the term of this patent is extended or adjusted under 35 U.S.C. 154(b) by 384 days.

(21) Appl. No.: 13/935,824

(22) Filed: Jul. 5, 2013

(65) Prior Publication Data

US 2014/0012405 A1 Jan. 9, 2014

(30) Foreign Application Priority Data

Jul. 5, 2012 (EP) ..................................... 12175129

(51) Int. Cl.
*G06F 17/00* (2006.01)
*G06Q 10/06* (2012.01)

(52) U.S. Cl.
CPC ................ *G06Q 10/06* (2013.01); *G06F 17/00* (2013.01)

(58) Field of Classification Search
CPC ................ G05B 13/04; G05B 19/418; G05B 19/41865; G05B 2219/31372; G05B 2219/31395; G05B 2219/31449
USPC ............... 700/96, 97, 99, 101, 102, 103, 105, 700/109; 706/46, 47; 707/601
See application file for complete search history.

(56) References Cited

U.S. PATENT DOCUMENTS

| | | | |
|---|---|---|---|
| 8,032,243 B2 | 10/2011 | Raviola et al. | |
| 8,341,596 B2* | 12/2012 | Peretti | G06N 5/025 700/21 |
| 2002/0023329 A1* | 2/2002 | Nulman | G05B 19/4183 29/25.01 |
| 2002/0055925 A1* | 5/2002 | Kondo | G05B 19/41875 |

(Continued)

FOREIGN PATENT DOCUMENTS

EP 2040204 A1 3/2009

*Primary Examiner* — Robert Fennema
*Assistant Examiner* — Jennifer L Norton
(74) *Attorney, Agent, or Firm* — Laurence A. Greenberg; Werner H. Stemer; Ralph E. Locher

(57) ABSTRACT

A system handles conditional dependencies between alternative product segments of a production process modeled within a manufacturing execution system (MES). The system includes data processing units connected to a network and production components. The data processing units run MES software for controlling and monitoring the process. The MES software includes a production modeler embedding time-sensitive dependency information in each product segment to define the start of execution in relation to another product segment. The production modeler embeds in each product segment programmed for alternative execution conditional dependency information and a sequence attribute about the order of evaluation of the specified condition. The MES software, during execution of a product segment preceding alternative executions, checks the condition specified as first in the set of sequence attributes and, if that condition is satisfied, executes the product segment corresponding with that condition, otherwise iterates the check for execution until a condition is satisfied.

11 Claims, 5 Drawing Sheets

(56) References Cited

U.S. PATENT DOCUMENTS

| | | | | |
|---|---|---|---|---|
| 2003/0004595 A1* | 1/2003 | Seimiya | G06Q 10/087 | 700/97 |
| 2003/0172371 A1* | 9/2003 | Offenmuller | G06Q 10/06 | 717/120 |
| 2004/0255296 A1* | 12/2004 | Schmidt | G06F 9/4887 | 718/100 |
| 2006/0004749 A1* | 1/2006 | Dettinger | G06Q 10/06 | |
| 2008/0091289 A1* | 4/2008 | Gozzi | G06Q 10/06 | 700/100 |
| 2008/0294279 A1* | 11/2008 | Tiozzo | G05B 19/41865 | 700/100 |
| 2009/0076785 A1* | 3/2009 | Raviola | G06Q 10/00 | 703/6 |
| 2009/0088870 A1* | 4/2009 | Baier | G05B 19/41865 | 700/28 |
| 2009/0094541 A1* | 4/2009 | Foulger | G06F 9/5044 | 715/764 |
| 2009/0216699 A1* | 8/2009 | Kelly | G06Q 10/087 | 706/46 |
| 2009/0287337 A1* | 11/2009 | Raviola | G05B 19/045 | 700/103 |
| 2010/0082132 A1* | 4/2010 | Marruchella | G05B 19/41835 | 700/86 |
| 2010/0205401 A1* | 8/2010 | Henry | G06F 9/30058 | 712/205 |

* cited by examiner

METHOD AND SYSTEM FOR HANDLING CONDITIONAL DEPENDENCIES BETWEEN ALTERNATIVE PRODUCT SEGMENTS WITHIN A MANUFACTURING EXECUTION SYSTEM ANSI/ISA/95 COMPLIANT

CROSS-REFERENCE TO RELATED APPLICATION

This application claims the priority, under 35 U.S.C. §119, of European application EP 12 175 129.1, filed Jul. 5, 2012; the prior application is herewith incorporated by reference in its entirety.

BACKGROUND OF THE INVENTION

Field of the Invention

The present invention refers to the field of manufacturing execution systems (MES), and more precisely to a method and a system for handling conditional dependencies between alternative product segments within a manufacturing execution system being ANSI/ISA/95 compliant.

To increase competitiveness, manufacturers need to simultaneously reduce time-to-market, increase process visibility and production flexibility, optimize forecasting and scheduling, and reduce scrap, stock levels and downtimes; all while ensuring optimal quality and production efficiency across all global facilities. Meeting these goals requires an integrated information technology (IT) infrastructure that helps coordinate production on a global scale and, if necessary, in real time. Examples include specifications, equipment and facilities, processes and procedures and quality tests, as well as personnel resources. Today, there are proven systems on the market that address the need for greater performance from the plant floor. They are manufacturing execution systems (MES), generally defined as the layer that integrates the business systems, e.g. the enterprise resource planning (ERP) and control systems. Many publications address MES concepts and implementations, for example the article by Dirk Kozian titled: "Software fur die Automatisierung—Transparenz uber die Ablaufe schaffen", published in Elektronik fur die Automatisierung, 11, Nov. 17, 1999.

The "Manufacturing Enterprise Solutions Association" International (MESA) calls the MES: " . . . a dynamic information system that drives effective execution of manufacturing operations. Using current and accurate data, MES guides, triggers and reports on plant activities as events occur. The MES set of functions manages production operations from point of order release into manufacturing to point of product delivery into finished goods. MES provides mission critical information about production activities to others across the organization and supply chain via bi-directional communication."

The ASI/ISA/95 standardizes a common framework directed to the present and future MES developers. The ANSI/ISA/95 "Enterprise Control System Integration" includes:
Part 1: Models and Terminal ANSI/ISA/95 terminology;
Part 2: Object Model Attributes;
Part 3: Activity Models;
Part 4: Object models and attributes of manufacturing operations management activities (in development at the time of publication of this standard);
Part 5: Business-to-manufacturing transactions; and
Part 6: Manufacturing operations transactions (in development at the time of publication of this standard).

Because of its generality there is room for developing original customer solutions in line with this standard. FIG. 3 of Part 1 of the ASI/ISA/95 "Enterprise Control System Integration" (omitted) reproduces by ellipses a Multi-level hierarchy of activities depicted in Part 1. This model is subdivided in four superimposed Levels, MES is located at Level 3 while ERP at Level 4. Most MES systems include Programmable Logic Controllers (PLC) and the connectivity to Supervisory Control and Data Acquisition (SCADA) and Distributed Control System (DCS) as part of their product offering for exchanging plant floor data. FIG. 7 of Part 1 of the ASI/ISA/95 "Enterprise Control System Integration" (omitted) reproduces by ellipses connected by arrows a functional data flow model for the production operations management, intended as the collection of activities which coordinate, direct, and track the functions that use raw materials, energy, and information to produce product. The MES carries out the production control function, the ERP the other functions.

A dynamic representation of the flow model shall sequence the production steps into a workflow for obtaining a final product according to relevant production rules, to say production specific operations instructions. This implies a preliminary segmentation of the production process into a plurality of product segments, as the overlap of information between Product Production Rules (PPR) and the bill of resources. The product segment is a model that describes a job or task consisting of one of more work elements, usually done essentially in one location. A product segment is the most detailed process view for the business system to control material, labor, resource usage, cost, and quality in order to control the production. Product segments may correspond to:
IEC 61512-1 process stages, process operations, unit procedures, or operations for batch manufacturing;
production unit operations for continuous manufacturing;
assembly steps and assembly actions for discrete manufacturing; and
other types of identifiable time spans for other types of manufacturing.

A workflow in a manufacturing execution system has to be considered as an extension of the data contained into product production rule (PPR) information. In this sense a workflow does not have its own version and lifecycle but inherits the ones of PPR. Basically each step of a workflow has a one-to-one correspondence with a Product Segment of the PPR. The data model of the Product Production Rule is extended in order to contain:
the connections (branches) among the workflow steps;
the expressions used to configured it (e.g. to evaluate a condition); and
the workflow layout.

Profitably, a Graphical User Interface (GUI) interacting with the MES software is commonly used to design workflows in a very simple way, for example, by picking up icons from a tool-box on the screen and placing it in the assigned position of the visible layout of the workflow under construction. The same GUI interface permits the operator to browse the current state of the production process.

A workflow should also support a subset of the Workflow Patterns defined by the Workflow Pattern Initiative (WPI): the joint effort of Eindhoven University of Technology and Queensland University of Technology since 1999, the aim of which is to provide a conceptual basis for process technology. This subset should satisfy requirements coming especially from Process and Life Sciences Industries.

The main pattern codes defined by WPI are the following:
Sequence: a task in a process in enabled after the completion of a preceding task in the same process.

Parallel Split: allows a single thread of execution to be split into two or more branches which can execute tasks concurrently.

Synchronization (AND Join): a mean of reconverging the execution threads of two or more parallel branches, created using the Parallel Split task earlier in the WF.

Exclusive Choice (Switch): the divergence of a branch into two or more branches such that when the incoming branch is enabled, the thread of control is immediately passed to precisely one of the outgoing branches based on a mechanism that can select one of the outgoing branches.

Simple Merge (XOR Join): the convergence of two or more branches into a single subsequent branch.

Structured Loop: the ability to execute a task or sub-process repeatedly.

Indubitably a goal of the companies that offer MES-based information technology solutions for Totally Integrated Automation (TIA), Service Oriented Architectures (SOA), is that to be ANSI/ISA/95 compatible. This shall not preclude the freedom of introducing original contributes at the engineering phase. Siemens offers a broad range of TIA solutions under its SIMATIC® product family situated within the field of manufacturing execution system (MES). As far as concerns the compatibility with ISA/95, almost all WPI structures listed above do not give rise to problem in maintaining the compatibility when translated into a MES workflow. The only exception stems from the Exclusive Choice for switching between various alternatives if a relevant condition is true (the mechanism stated in WPI).

The workflow of FIG. 1 attempts to implement the Exclusive Choice (Switch) pattern by a logical entity (?) of the IF-THEN-ELSE type. This workflow includes: five production steps A, B, C, D, E; a logical block 2 (?), a starter 1, a terminator 6, and arrows to indicate time dependencies between the steps. These production steps within a MES are considered as product segments and thus indicated by the same capital letters. The various product segments model the manufactured product at different phases of the production. The product segments B, C, D so as the conditional information on their execution are enclosed in three major blocks 3, 4, 5. In detail, block 3 includes the product segment B, the description of a CONDITION 1, and an associated attribute "sequence=2". Block 4 includes the product segment C, the description of a CONDITION 2, and its attribute "sequence=1". Block 5 includes the product segment D, the description of a CONDITION 3, and its attribute "sequence=3". The attribute "sequence" indicates a pre-established evaluation order of the three conditions.

The manufacturing process, after completing the product segment A, activates the logical block 2 to evaluate one of three conditions according to the order established in the engineering phase through the attribute "sequence". Condition 2 is the one to be evaluated first because it has the lowest sequence number. IF "condition 2" is TRUE the outgoing production step of product segment C will be executed. Alternatively IF "condition 2" is FALSE, the condition chosen according to the next sequence number (in the example "condition 1") is evaluated, and IF it is TRUE the related outgoing production step of product segment B will be executed. IF even "condition 1" is false, the algorithm is reiterated for "condition 3".

FIG. 2 is an alternative representation of the workflow of FIG. 1. In Applicant's opinion both workflows of FIGS. 1 and 2 are unknown in the MES, nevertheless they are not claimed due to drawbacks that are now underlined.

The workflow of FIG. 2 shows an additional entity with respect to the standard "Product definition model" reported in FIG. 4 (that will be described later on). The additional entity is a WorkflowNode 7 which includes the logical block 2 (?), Conditions 1, 2, 3, and the respective attributes "sequence" 2, 1, 3. Because of the presence of its additional entity 7, the workflow of FIG. 2 is outside the ANSI/ISA/95 standard, so any MES software strictly compliant with this standard should not recognize the unexpected entity. Besides, this entity shall be made persistent on the relational database handled by the MES software (e.g. the business database of SIMATIC IT) through dedicated tables, and these tables shall be replicated for each type-7 WorkflowNode used to build up more complex Workflows. Soon the size of MES database will increase noticeably, and even the queries for retrieving information about the workflow will come out more complex.

BRIEF SUMMARY OF THE INVENTION

A main purpose of the invention is to indicate a way to carry out the Exclusive Choice (Switch) inside the Product Production Rules of the international standard ANSI/ISA/95, without introducing any further entity with respect to the existing model of "Product definition".

Another purpose is that to simplify the queries on the MES database.

The invention achieves the object by providing a system for handling conditional dependencies between alternative product segments of a production process modeled within a manufacturing execution system, called MES henceforth. The system includes:

a number of data processing units connected to a common network and running an MES software configured for controlling the production process operating production components;

a production modeler within the MES software enabled to embed time-sensitive dependency information in each product segment in order to define the start of execution in relation to another product segment;

the production modeler being further enabled for embedding in each product segment programmed for alternative execution conditional dependency information and an associated sequence attribute about the order of evaluation of the specified condition; and the MES software is configured to check during or at the end of execution of a product segment preceding alternative executions, the condition specified as first in the set of sequence attributes and, if that condition is satisfied, executing the product segment corresponding with that condition, otherwise iterating the check for execution until a condition is satisfied.

According to one aspect of the invention, the production modeler is further configured for assigning a timeout attribute to check the condition, and the MES software is configured to wait for the check result up to the lapse of the timeout and then checking a successive condition.

According to one aspect of the invention, the conditional dependency information includes values of physical parameters, such as temperature, pressure, density, and so on, measurable during or at the end of the production step.

According to another aspect of the invention, the conditional dependency information includes quality indicators associated to the product segment.

According to another aspect of the invention, the conditional dependency information includes business indicators associated to the product segment.

It is also an object of the invention to provide a method for handling conditional dependencies between alternative product segments of a production process modeled within a manufacturing execution system, called MES henceforth. The method includes the steps of:

providing a number of data processing units and connecting them to a common network, loading into the processing units an MES software configured for controlling the production process operating production components;

providing a production modeler within the MES software enabled to embed time-sensitive dependency information in each product segment in order to define the start of execution in relation to another product segment;

instructing the production modeler for embedding in each product segment programmed for alternative execution conditional dependency information and an associated sequence attribute about the order of evaluation of the specified condition; and instructing the MES software to check, during or at the end of execution of a product segment preceding alternative executions, the condition specified as first in the set of sequence attributes and, if that condition is satisfied, executing the product segment corresponding with that condition, otherwise iterating the check for execution until a condition is satisfied.

According to another aspect of the method, it includes the steps of: instructing the production modeler to assign a timeout attribute to the conditional dependency; and configuring the MES software to wait for the check result up to the lapse of the timeout and then checking a successive condition.

The segment dependency is a modeling structure already in use for temporal dependencies. The fact of extending the capabilities of this entity for defining the Exclusive Choice path is an optimization, since the user can work with familiar tools to model both types of dependencies, the temporal and the new conditional one.

Differently from the unclaimed solution of FIG. 2, no additional entity is needed to implement the Exclusive Choice, thus without altering the ANSI/ISA/95 Product Production Rules.

In the modeling phase the system checks that the conditional dependencies are well defined and at the successive production phase the MES system evaluates automatically the conditions and chooses the execution branch. Both types of dependencies can be also available to the system scheduler and their extension could allow the generation of a better production plan.

The following further demonstrates the benefits of the invention by a direct comparison between two workflows preceded by a short view on the standard. Since the ANSI/ISA/95 draft of May 2001, the "dependency" has been embedded into the product segment. Further, in Part 2—Table 56 titled: "Attribute of Operations Segment Dependency", the following attributes have been specified: ID, Description, Dependency Type, Dependency Factor, Unit of Misure. For instance, temporal dependency type using A and B to identifying two product segments and T to identify the timing factor (not to be confused with the new attribute timeout), includes the following dependencies:

NotFollow==B cannot follow A;
PossibleParallel==B may run in parallel to A;
NotInParallel==B may not run in parallel to A;
AtStart==Start B at A start;
AfterStart==Start B after A start;
AfterEnd==Start B after A end;
NoLaterAfterStart==Start B no later than T (Timing Factor) after A start;
NoEarlierAfterStart==Start B no earlier than T (Timing Factor) after A start;
NoLaterAfterEnd==Start B no later than T (Timing Factor) after A end;
NoEarlierAfterEnd==B no earlier than T (Timing Factor) after A end.

Should the AfterEndStart dependency be implemented in concomitance with the Exclusive Choice having conditions 1, 2, 3, (as done in the workflow of FIG. 2 for product segments A, B, C, D) by introducing the unclaimed object WorkflowNode 7, the entities into play are:

1. Product segment A.
2. WorkflowNode 7 with conditions 1, 2, 3.
3. Dependency AfterEnd between node 7 and A.
4. Product segment B.
5. Dependency AfterEnd between B and node 7 (if condition 1 is true).
6. Product segment C.
7. Dependency AfterEnd between C and node 7 (if condition 2 is true).
8. Product segment D.
9. Dependency AfterEnd between D and node 7 (if condition 3 is true).
10. Dependency AfterEnd between E and B.
11. Dependency AfterEnd between E and C.
12. Dependency AfterEnd between E and D.

Twelve entities are involved, and the following is a possible query:

"select* from ProductSegmentTable, WorkflowNodeTable, . . . , where . . . ", wherein the joined element WorkflowNodeTable is a complication.

Conversely, using the present invention to implement the same situation, the simplified workflow of FIG. 5 will be obtained, and the entities into play are:

1. Product segment A*.
2. Product segment B*.
3. Product segment C*.
4. Product segment D*.
5. Dependency AfterEnd between B* and A* (if condition 1 is true).
6. Dependency AfterEnd between D* and A* (if condition 2 is true).
7. Dependency AfterEnd between D* and A* (if condition 3 is true).
8. Dependency AfterEnd between E* and B*.
9. Dependency AfterEnd between E* and C*.
10. Dependency AfterEnd between E* and D*.

Ten entities are involved instead of twelve and a simpler query is:

"select* from ProductSegmentTable, . . . , where . . . ",

A noticeable saving of resources since the saving should be multiplied by the considerable number of exclusive choices generally present in any complete workflow of a production process.

In spite of the technical problem and the above arguments being discussed with reference to graphical representation of the workflows, it is useful point out that the invention is not focused on the graphical presentation of the workflow by a GUI; rather it is focused on how implementing the new conditional dependency on product segments. Handling with product segments in a new way also entails a new layout of the workflow as a direct consequence.

Other features which are considered as characteristic for the invention are set forth in the appended claims.

Although the invention is illustrated and described herein as embodied in a method and a system for handling conditional dependencies between alternative product segments within a manufacturing execution system ANSI/ISA/95 compliant, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DESCRIPTION OF THE INVENTION

Figure 3:
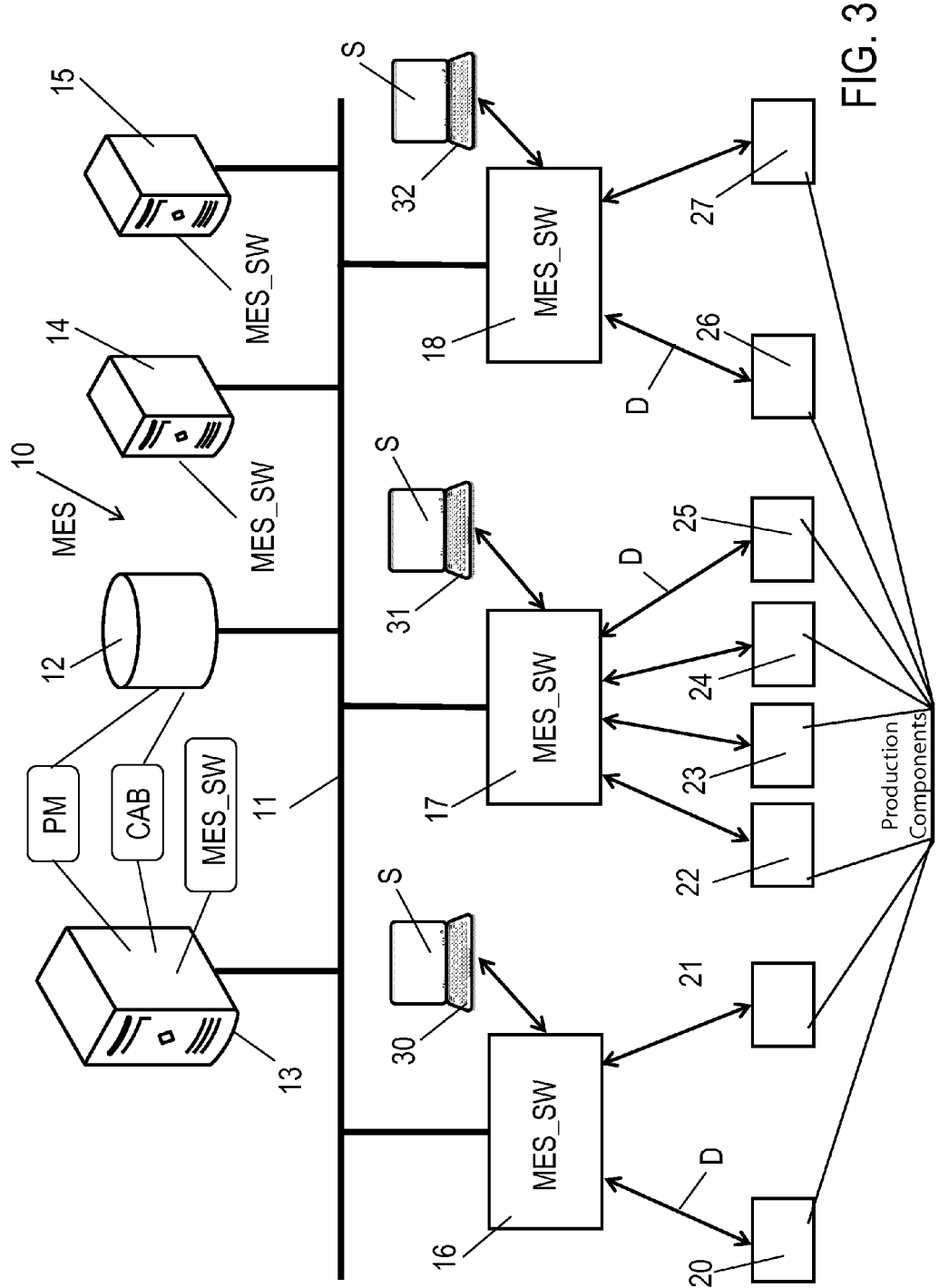
FIG. 3 is a schematic overview of a manufacturing execution system for the management of a production process inside a plant.

Referring now to the figures of the drawings in detail and first, particularly to FIG. 3 thereof, there is shown a schematic overview of a plant control system 10 working as a manufacturing execution system (MES). The MES 10 includes a network 11 connecting a number of data processing units 13, 14, 15, 16, 17, 18, and a database 12. Without limitations, at physical level the network 11 is a Gigabit Ethernet on optical fiber according to the IEEE 802.3 standard. The data processing units 13 to 18 are running MES software MES_SW for controlling and/or monitoring a production process operating a number of production components 20, 21, 22, 23, 24, 25, 26, 27. The production components 20 to 27 can be equipment, single sensors or actuators activatable inside equipment. Exemplary production components are: photocells, manometers, thermometers, motors, step-drives, conveyors, valves, pumps, and the like. The data processing units 13 to 18 are network computers which typically contain logical units, calculation devices, storage devices, display devices, interfacing devices, and the like. They are connected to the plant network 11 to exchange data to the required extent. One of the data processing units hereinafter referred to a master console 13 executes the MES_SW software for controlling and monitoring the operation of the plant and supervising the other data processing units 14 to 18. The two processing units 14 and 15 have no direct links with production components, they are spare or used for maintenance, backup, etc. The archive 12 contains a MES relational database storing: business libraries, historical data, customer developed applications, and the like. The archive 12 can be queried to retrieve data relevant to the plant and the developed projects. Optionally, the data processing units 16, 17, 18 having direct links with respective production components 20 to 27 can be PLCs, profitably upgraded and endowed with supplementary intelligence for MES uses, as the ones commercialized by the applicant under SIMATIC® trademark. The MES software running within the master console 13 includes a modeling routine prompted by input information about a product to be produced and the relevant manufacturing process (technical and business information are inputted). The modeling routine performs a segmentation of the production process information into a set of product segments having the information for linking one to another embedded. Further, the modeling routine is a production modeler PM enabled to define business logic within a fully graphical environment as facilitated by MES software. The business logic, when finally generated by the production modeler PM, contains a plant model of the production process and the related operating procedures for the production components 21 to 27 in a fully graphical environment. Even for the creation of the business logic, high-level graphical language is used within the MES software, preferably consistently with the ANSI/ISA/95 standard. The master console 13 further contains a client application builder CAB within the MES software. The CAB builder is enabled to provide native WEB based graphical user interface for generating cross-functionality graphic screen S. The screen forming part of the system 10 as Presentation Clients 30, 31, 32 and displays data D which is stemming from the production components 20 to 27 and which is manipulated from the business logic by the production modeller PM, where it is required. The term WEB based describes a standardized way of integrating applications over Internet Protocol (IP), such as HTPP or SMTP, using open source standards such as XML, SOAP, WSDL, and UDDI.

Nowadays graphical interfaces are universally adopted in all factory control systems, since these interfaces represent a valid help for customers without any familiarity with program languages, who are permitted to project their production tasks from scratch, or modifying a previous workflow, by pick-and-place typical of WYSWYG. Graphical interfaces even allow of tracking the execution of the production processes.

The plant control system 10 further contains within the MES software, preferably within the product modeller PM, a routine for handling time-sensitive dependencies as stated in ANSI/ISA/95 concerning the property "Type" of the product segment, i.e. AfterEnd, AfterStart, and so on.

According to the present invention, the plant control system 10 further contains within the MES software, preferably within the product modeller PM, a routine for handling conditional dependencies. This permits carrying out Exclusive Choice in simple manner. The following FIGS. 4 and 5 better illustrate this concept.

Figure 4:
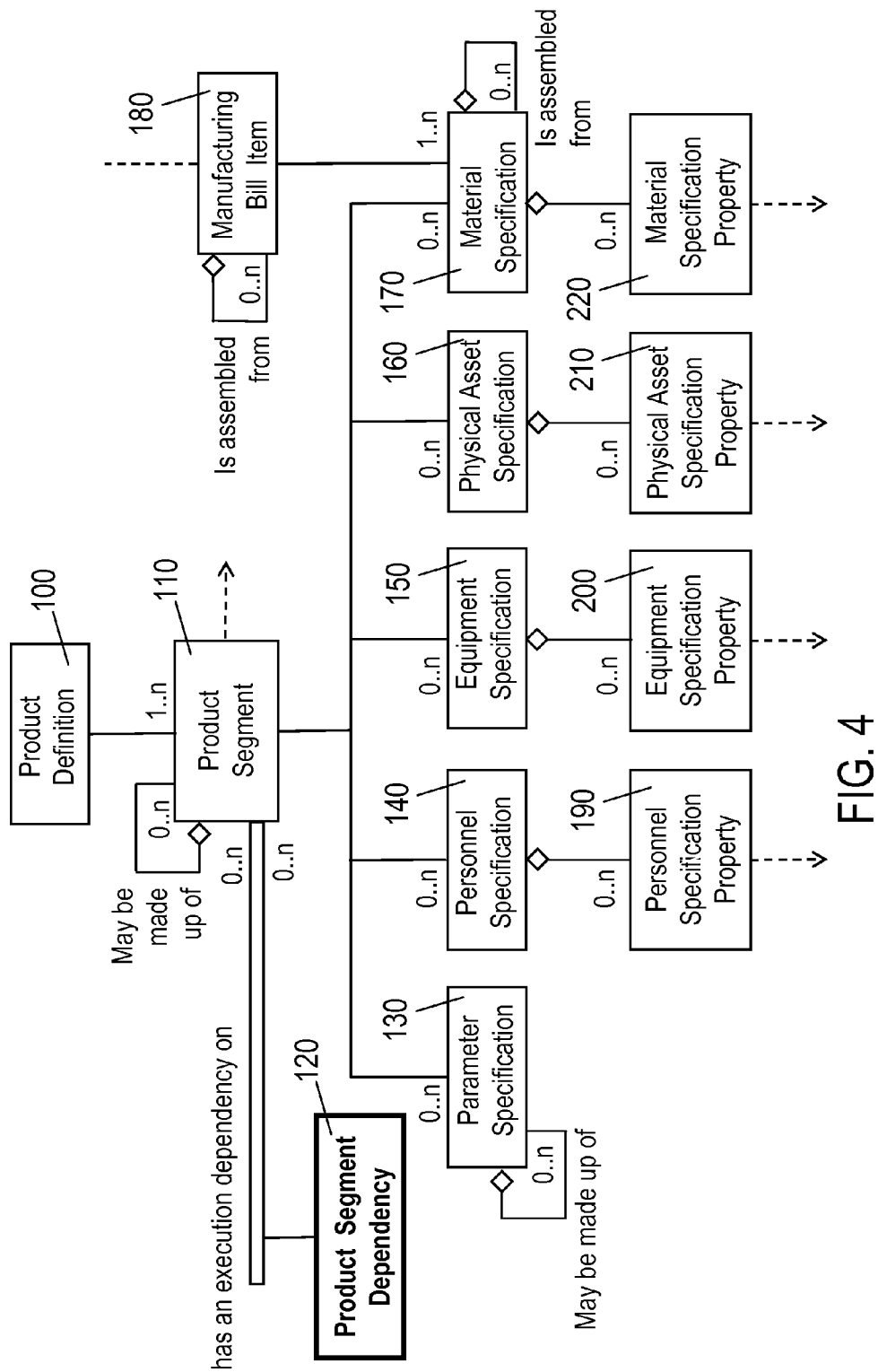
FIG. 4 is a diagram which reproduces part of the "product definition model" reported in the Annex A (Normative) of ANSI/ISA/95—Part 2.

FIG. 4 illustrates the standard model for a product segment 110, which also specifies other product segments, from 1 to n. The product segment 110 is part of product definition 100. The latter is a collection of information about resources, production rules and scheduling required to create a product. A product definition has external reference to a bill of materials, a product production rule (PPR or recipe), and a bill of resources. Examples of product definition rules are a general site or master recipe (IEC 61512-1 definitions), product data application protocol (AP) as defined in ISO 10303-1, standard operating procedure (SOP), standard operating conditions (SOC), routing, or assembly steps based on the production strategy used. Ultimately, product definition 100 also represents product production rules.

Each product segment 110 may contain the following, from 0 to n: parameter specification 130, personnel specification 140, equipment specification 150, physical asset specification 160, material specification 170. The specifications 130 to 170 have associated respective properties 190, 200, 210, 220, each from 0 to n. The product segment 110 has an execution dependency on the product segment dependency 120. The product segment dependency 120 may include all information on the sequence and time-sensitive requirements of the product segment 110 relative to other product segments. Further, the product segment 110 may include another dependency called hereinafter "conditional dependency" and the product segment dependency 120 may include all information needed to support the conditional dependency. During the production the MES system evaluates automatically the conditions and activates the next production step (product segment) of N alternatives.

In conclusion, product segment dependency 120 becomes a conditional dependency entity and is modeled through the following properties:

ProductionStepFrom (already existing);
ProductionStepTo (already existing);
Type(already existing, i.e. AfterEnd, AfterStart and so on);
Sequence (new, i.e. 1, 2, 3 and so on);
Condition (new, i.e. "temperature >100° C.", "pressure <5 mbar" and so on); and
Timeout (new, i.e. 10 minutes).

So the idea of modeling the Exclusive Choice pattern by extending the segment dependency entity, allows a MES system to remain adherent to international standard ANSI/ISA/95, even supporting the workflow functionality. In fact, the Product Definition model continues to consist of the standard entities and only some adjustments are introduced to make them more flexible.

Figure 5:
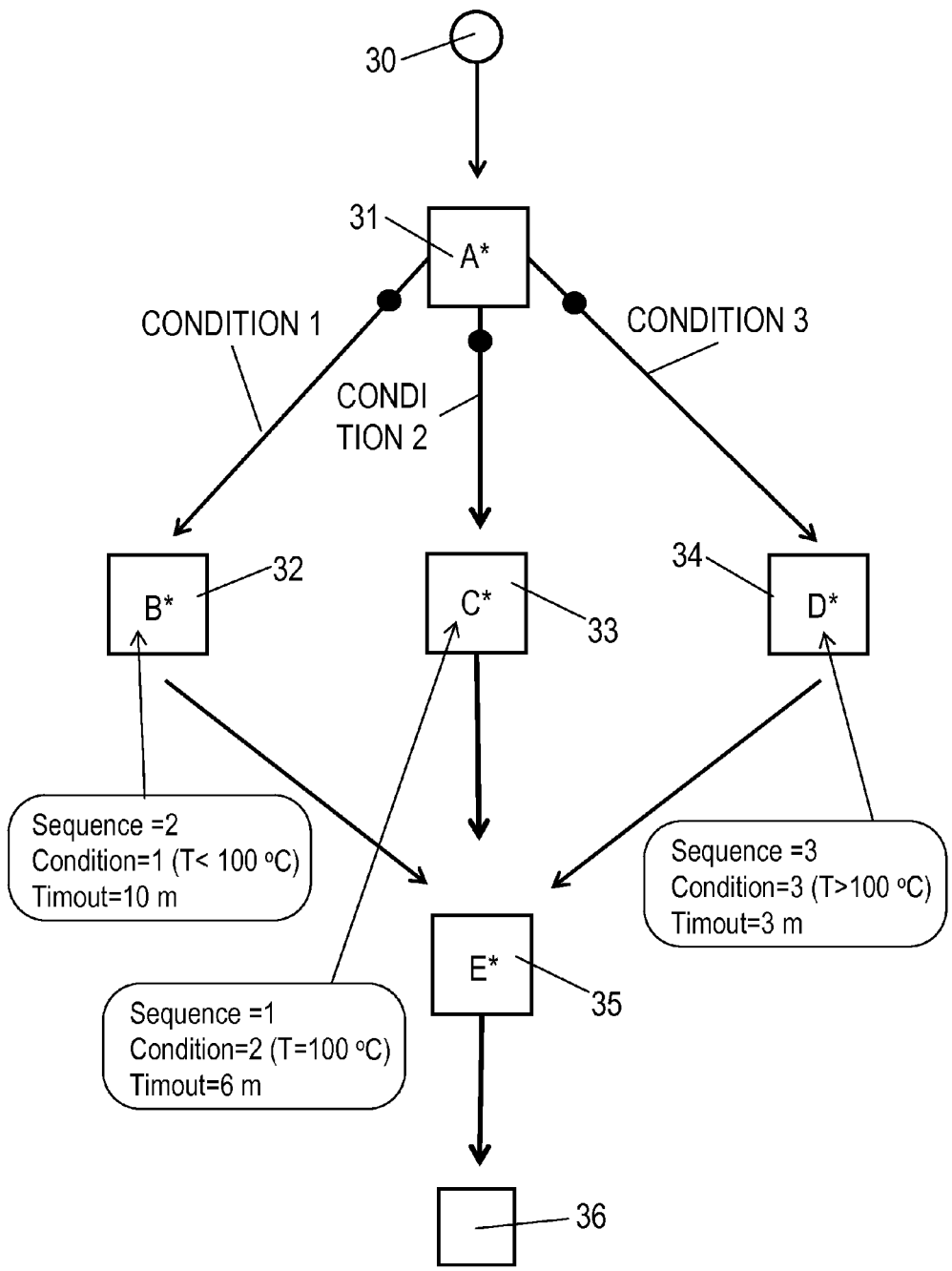
FIG. 5 is a workflow diagram according to the invention for implementing three conditional switches between product segments.

FIG. 5 shows a workflow of the exclusive choice between three alternatives based on the Product Segment Dependency 120 upgraded as stated above.

Figure 1:
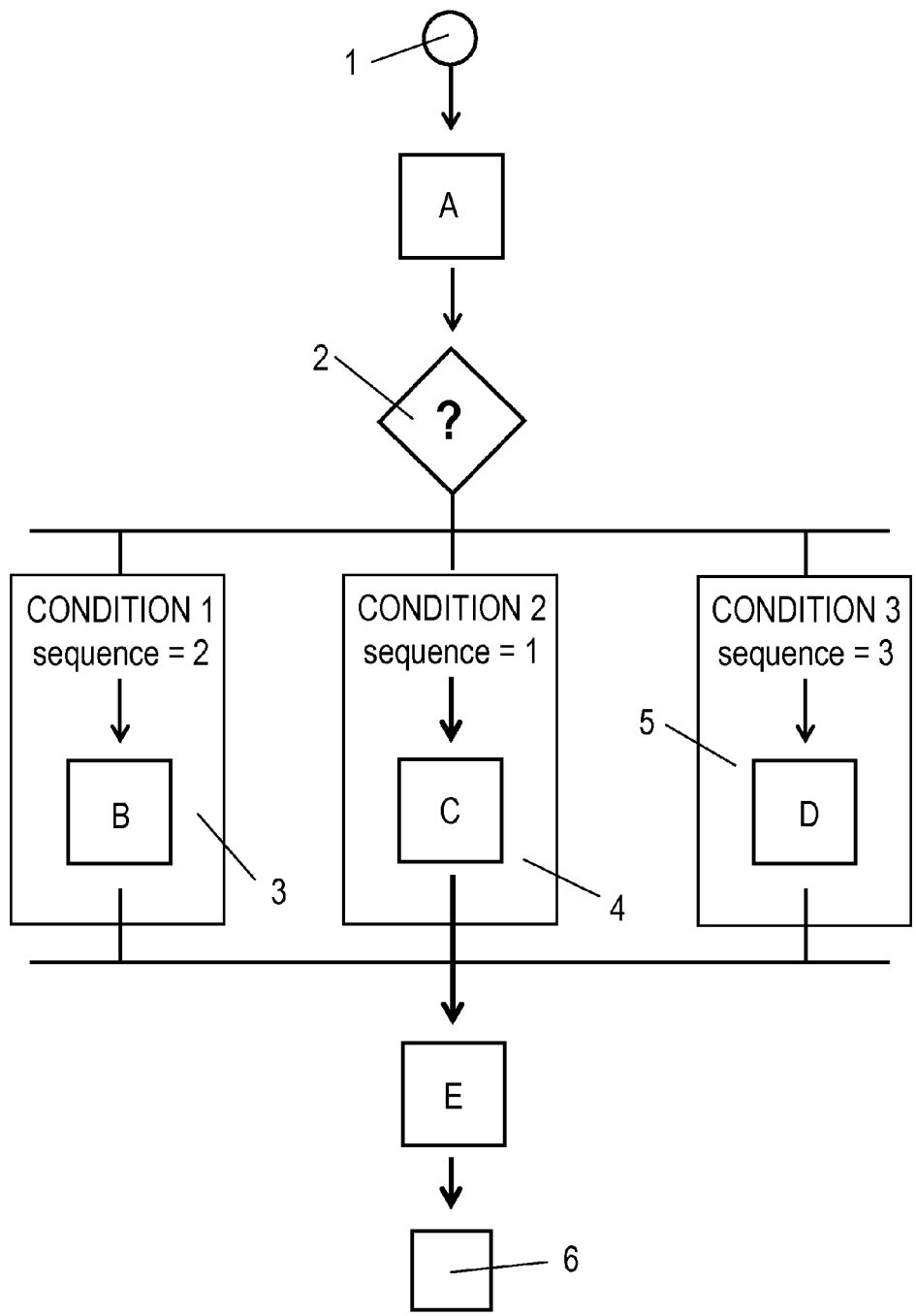
FIG. 1 is a workflow diagram for implementing an Exclusive Choice pattern as defined by the Workflow Pattern Initiative (WPI), the workflow implements three conditional switches between an equal number of product segments.
Figure 2:
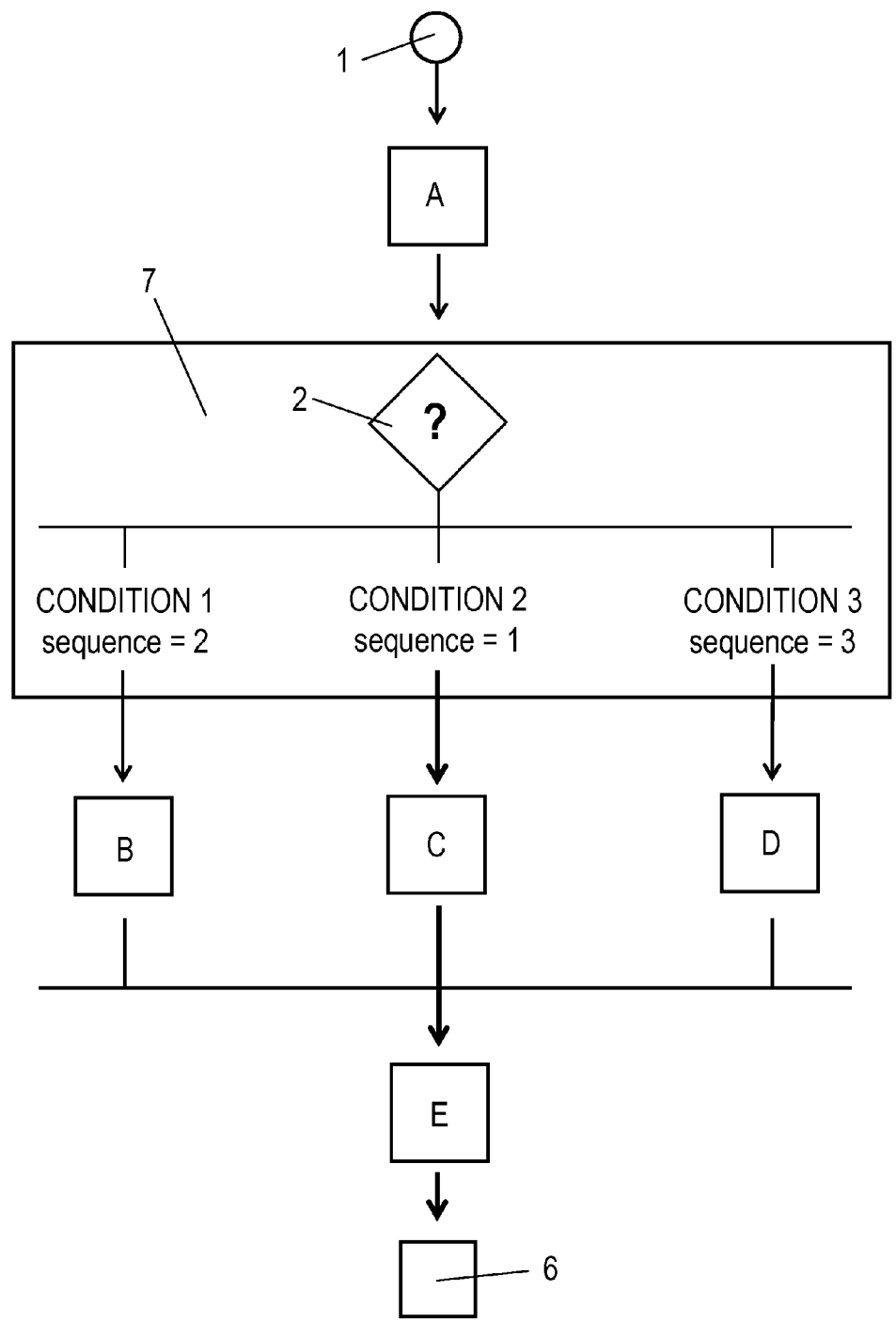
FIG. 2 is a workflow diagram being a rearrangement of the workflow of FIG. 1.

With reference to FIG. 5 five product segments A*, B*, C*, D*, E* are present, a starter 30 and a terminator 36. The five product segments are linked to each other through arrows that represent dependencies. The three arrows which connect the product segment A* to B*; A* to C*; and A* to D* are marked with a black dot to indicate both temporal and conditional dependencies, the other arrows only indicate temporal dependency. The starting product segment A* is the one in progress for manufacturing the final product resultant at the end of the production of the product segment E*. In operation, at engineering phase the Product Modeler PM (FIG. 4) inside the MES software MES_SW, completes all dependencies for each product segment A* to E*. These dependencies are time-sensitive for all the five product segments A* to E* and further conditional for the only product segments B*, C*, D*. All time-sensitive dependencies are AfterEnd, although the invention is not limited to this data pattern since the skilled in the MES should adapt this example to the other data patterns. As far as concerns the conditional dependency, specific information on Sequence, Condition, and Timeout are embedded in the product segments B*, C*, D* for enabling the MES execution program (i.e. the scheduler routine) to carry out an exclusive choice after the end of segment A*. The switching rules are those already described when illustrating the workflow of FIG. 1, but a noticeable simplification is evident at a glance. The example is referred to a boiler control.

Although the invention has been described with particular reference to a preferred embodiment, it will be evident to those skilled in the art, which the present invention is not limited thereto, but further variations and modifications may be applied without departing from the scope of the invention as defined by the annexed claims.

The invention claimed is:

1. A system for handling conditional dependencies between alternative product segments of a production process modeled within a manufacturing execution system (MES), the system comprising:

a common network;
a number of data processing units connected to said common network and running MES software for controlling the production process operating production components;
a production modeler within the MES software enabled to embed time-sensitive dependency information in each product segment for defining a start of execution in relation to another product segment, the production modeler being further enabled for embedding, in each of the product segments programmed for alternative execution, conditional dependency information including a specified condition and an associated sequence attribute indicating an order in which the specified conditions of the product segments will be evaluated in relation to the other product segment; and
said MES software configured to check, during or at an end of execution of the product segment preceding alternative executions, one of the specified conditions which is specified as first by the sequence attribute and, if the condition, which is specified as first, is satisfied, executing the product segment corresponding with the condition, otherwise iterating a check for execution until the condition is satisfied.

2. The system according to claim 1, wherein said production modeler is further configured for assigning a timeout attribute to check the condition, and the MES software is configured to wait for a check result up to a lapse of a timeout and then checking a successive condition.

3. The system according to claim 1, wherein the conditional dependency information includes values of physical parameters measurable during or at the end of the production step.

4. The system according to claim 1, wherein the conditional dependency information includes business indicators associated to the product segment.

5. The system according to claim 1, wherein the conditional dependency information includes quality indicators associated to the product segment.

6. The system according to claim 1, wherein said MES software is compliant with standard ANSI/ISO95.

7. The system according to claim 3, wherein the physical parameters are selected from the group consisting of temperature, pressure, and density.

8. A method for handling conditional dependencies between alternative product segments of a production process modeled within a manufacturing execution system (MES), which comprises the steps of:

providing a number of data processing units and connecting them to a common network, loading into the data processing units MES software configured for controlling the production process operating production components;
providing a production modeler within the MES software enabled to embed time-sensitive dependency information in each product segment to define a start of execution in relation to another product segment;
instructing the production modeler for embedding, in each of the product segments programmed for alternative execution, conditional dependency information including a specified condition and an associated sequence attribute indicating an order in which the specified conditions of the product segments will be evaluated in relation to the other product segment;
instructing the MES software to check, during or at an end of execution of the product segment preceding alternative executions, one of the specified conditions which is specified as first by the sequence attribute and, if the condition, which is specified as first, is satisfied, executing the product segment corresponding with the condition, otherwise iterating a check for execution until the condition is satisfied.

9. The method according to claim 8, which further comprises:
   instructing the production modeler to assign a timeout attribute to the conditional dependency; and
   configuring the MES software to wait for a check result up to a lapse of a timeout and then checking a successive condition.

10. The method according to claim 8, wherein the order indicated by the associated sequence attribute is an order in which the specified conditions of the product segments will be evaluated during the other product segment or immediately after completing the other product segment.

11. The system according to claim 1, wherein the order indicated by the associated sequence attribute is an order in which the specified conditions of the product segments will be evaluated during the other product segment or immediately after completing the other product segment.

* * * * *